United States Patent [19]

Wang et al.

[11] Patent Number: 4,964,089
[45] Date of Patent: Oct. 16, 1990

[54] METHOD FOR DERIVATION OF INTERNAL VELOCITIES FROM POST-MIGRATION PARTS

[75] Inventors: Shein S. Wang; Douglas W. Hanson; Thomas D. Cavanaugh, all of Ponca City, Okla.

[73] Assignee: Conoco Inc., Ponca City, Okla.

[21] Appl. No.: 455,692

[22] Filed: Dec. 22, 1989

[51] Int. Cl.$^5$ ............................................. G01V 1/36
[52] U.S. Cl. ....................................... 367/73; 367/50; 367/51; 364/421
[58] Field of Search ................... 364/421; 367/50, 51, 367/52, 53, 73

[56] References Cited

U.S. PATENT DOCUMENTS

| | | | |
|---|---|---|---|
| 4,241,429 | 12/1980 | Bloomquist et al. | 367/52 |
| 4,736,347 | 4/1988 | Goldberg et al. | 367/46 |
| 4,745,585 | 5/1988 | Larner | 367/50 |
| 4,766,574 | 8/1988 | Whitmore, Jr. et al. | 367/50 |
| 4,802,146 | 1/1989 | Moeckel | 367/52 |
| 4,813,027 | 3/1989 | Tieman | 367/52 |
| 4,839,869 | 6/1989 | Corcoran | 367/53 |
| 4,849,887 | 7/1989 | Skylas | 364/421 |
| 4,876,673 | 10/1989 | McCowan | 367/52 |

Primary Examiner—Ian J. Lobo

[57] ABSTRACT

A method for derivation of interval velocities from post-migration parts first includes the step of determining the apparent depth and slope of an event. The apparatus depth of an event is measured. The travel time of the recorded reflection for a particular offset is determined by ray-tracing through the old model and recorded. A trial velocity is assigned to the layer between events in the new model. The depth of the reflector is varied up or down until the computed travel time agrees with the measured travel time, keeping the source/receiver separation constant. A new velocity for the layer between reflectors is selected for which the depths at each offset are the same.

6 Claims, 4 Drawing Sheets

METHOD FOR DERIVATION OF INTERNAL VELOCITIES FROM POST-MIGRATION PARTS

BACKGROUND OF THE INVENTION

1. Field of the Invention

The present invention relates to a method and apparatus for deriving interval velocities and more particularly to methods for deriving the correct interval velocity from observed residual moveout in post migrated parts.

2. Related Prior Art

When seismic data is sorted into common-offset panels, each offset can be processed as if it were an individual seismic section. Common-offset depth migration converts each offset panel into a depth section, each of which represent the same subsurface structure. With a perfect velocity model, each offset section will yield identical images. For real seismic data, it is normally impossible to obtain a perfect velocity model and the migrated offset sections are different.

When these common-offset depth sections are sorted into common midpoint (CMP) gathers, differences in the images with offset can be readily seen. There are three post-migration parts (PMP's- migrated common offset depth sections sorted into common midpoint gathers) displayed in FIGS. 1A through 1C. Near offset traces are to the right.

In FIG. 1A, the velocity above the reflector is correct (4900 ft/sec). A flat-imaged event indicates that the reflector was depth migration to the same depth at each offset and, hence, the velocity model used in the migration is correct. In FIG. 1B, it is 5150 ft/sec, 250 ft/sec too high, and the image shows an increase in depth with offset. In FIG. 1C, the velocity is 4650 ft/sec, 250 ft/sec too slow, and the image shows a decrease in depth with offset.

FIG. 2 is a display of a migrated depth section obtained with a velocity model that is correct for reflector A and B but too slow for reflector C. In FIG. 3, the PMP at shot point 8274 is displayed. Near offset traces are to the left. It can be observed that event A and B correspond to flat images. Thus, it can be seen that the interval velocities above these reflectors are correct. Event C, on the other hand, corresponds to an image which decreases in depth with offset. Thus, it appears that the velocity above this reflector is too slow.

The common method of determining the correct velocity above reflector C is to migrate the data with several velocities until one is found which produces a flat image. This repetitive migration method, even though accurate, is time consuming and expensive.

There are many methods in the prior art for processing seismic data which require the determination of velocity. For example, U.S. Pat. Nos. 4,766,574 illustrates the alignment of seismic data migrated before stack but still requires a velocity determination.

U.S. Pat. No. 4,766,574 titled "Method for Depth Imaging Multicomponent Seismic Data, (Norman D. Whitmore, Jr., et al.), relates to a method of migrating time dependent reflectivity functions prior to stacking to obtain depth images of the earth's subsurface geological structure as well as estimates of shear and compressional wave interval velocities. Measures are obtained of generated seismic wavefields incident on reflecting interfaces or subsurface layer boundaries in the earth's crust. Measures are also obtained of resulting seismic wavefields scattered from these interfaces. The incident and scattered seismic wavefields are employed to produce time-dependent reflectivity functions representative of the reflecting interfaces. By migrating these time-dependent reflectivity functions, depth images of the reflecting interfaces can be obtained. For pairs of multicomponent seismic data, the dyadic set of multicomponent seismic data are partitioned so as to separate the variously coupled incident and reflected wavefields in the recorded multicomponent seismic data. The incident and reflected wavefields are cross-correlated to form time-dependent reflectivity functions. These time-dependent reflectivity functions are then iteratively migrated according to a model of wavefield velocities of propagation to obtain better estimates of the compressional and shear wave interval velocity. The migrated reflectivity functions can then be stacked to produce better depth images of the earth's subsurface geological structures.

Other methods may be used for migration but again, velocity is necessary. The following patents illustrate methods of migrating seismic data treating velocity determination in different stages.

U.S. Pat. No. 4,745,585, "Method of Migrating Seismic Data" (Kenneth L. Larner), relates to seismic data which is passed through a preselected number of migration stages. During each stage, data is migrated a plurality of times, where the migration-velocity function is a minor fraction of the velocity required to fully migrate the data in a single stage. The cascaded migration migrates data having steeply-dipping events with what is alleged to be greater noise reduction than does a single-stage migration.

U.S. Pat. No. 4,813,027 titles "Method and Apparatus for Enhancing Seismic Data" (Hans Tieman) relates to a method and apparatus for stacking a plurality of seismic midpoint gathers to provide a pictorial representation of seismic events. The approximate propagation velocity, corresponding to a selected event in a common midpoint gather, is determined by summing the common midpoint gather using first and second weights to provide respective first and second weighted sums over an offset based on an estimated velocity corresponding to the event. A velocity error value indicative of the approximate error between the estimated velocity and the actual velocity is developed from the sums. The common midpoint gather is then restacked in accordance with the determined propagation velocity to provide an enhanced pictorial representation of the seismic event. The first and second weighted sums are taken over a time window centered upon an estimated zero offset travel time for the event. The first and second weights can be selected to provide rapid, slow or intermediate convergence upon the true velocity. The velocity error value is determined as a function of the deviation of the peak of the first weighted sum from the center of the time window, relative to the deviation of the peak of the second weighted sum from the center of the time window. Alternatively, the velocity error value is determined as a function of the deviation of the peak of the cross-correlation of the first and second weighted sums from the center of the time window.

U.S. Pat. No. 4,241,429 titled "Velocity Determination and Stacking Process from Seismic Exploration of Three Dimensional Reflection Geometry" (Marvin G. Bloomquist et al) relates to a method for determining the dip and strike of subsurface interfaces and average propagation velocity of seismic waves. In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections in each set appear with time differences on a hyperbola with trace spacings determined by the source receiver coordinate distance along the lines of exploration. The offset of the apex of this hyperbola is determined from a normal moveout velocity search of the type performed on two dimensional common depth point (CDP) sets. This search identifies the correct stacking velocity and hyperbola offset which are used to determine dip, strike and average velocity.

U.S. Pat. No. 4,802,146 titles "Method for Movement Correction and Stacking Velocity Estimation of Offset VSP Data" (George P. Moeckel) relates to a moveout correction process and stacking velocity estimation process to permit stacking of vertical seismic profile (VSP) data. The primary reflection time is determined by using the two-way travel time, the root mean square velocity of acoustic pulses in the formation and the first arrival time of direct path acoustic pulses.

U.S. Pat. No. 4,736,347 titled "Multiple Stacking and Spatial Mapping of Seismic Data" (Bernard Goldberg et al.) relates to a method for determining the dip of subsurface formations and the apparent acoustic velocity. Seismic traces are stacked in a plurality of orthogonal measures to form multiple stacked traces at a positive offset. The stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined. Seismic data corresponding to the second reflecting boundary are then mapped spatially to the first reflecting boundary by ray tracing and by calculating the apparent velocities at the first boundary. The process is repeated for each succeedingly deeper boundary. The derived acoustic velocity model of the earth is displayed as a stacked seismic section in spatial coordinates. This process may be applied to obtain earth models and seismic sections in both two and three dimensions.

SUMMARY OF THE INVENTION

The present invention provides a method for deriving interval velocities from post-migration parts. The apparent depth and slope of an event is determined. The apparent depth of this event is measured for each offset in the post-migration parts. The travel time of the recorded reflection for a particular offset is found by ray-tracing through the old model. A trial velocity is assigned to the layer between selected events in the new model. For each offset, rays are traced from the source to a selected reflector and back to the receiver. The depth of the reflector is varied up or down until the computed travel time agrees with the measured travel time previously recorded. Note that the locations of the source and receiver will change as the depth of the reflector is varied in order to obey Snell's Law. However, the source receiver separation will be kept constant for each offset travel time. The best velocity for the layer between the selected reflectors is the one for which the depths at each offset are the same. Migration of the seismic data using a new model with the new velocity between the selected reflectors a new depth section may be provided.

DESCRIPTION OF THE PREFERRED EMBODIMENT

Figures 2, 3:
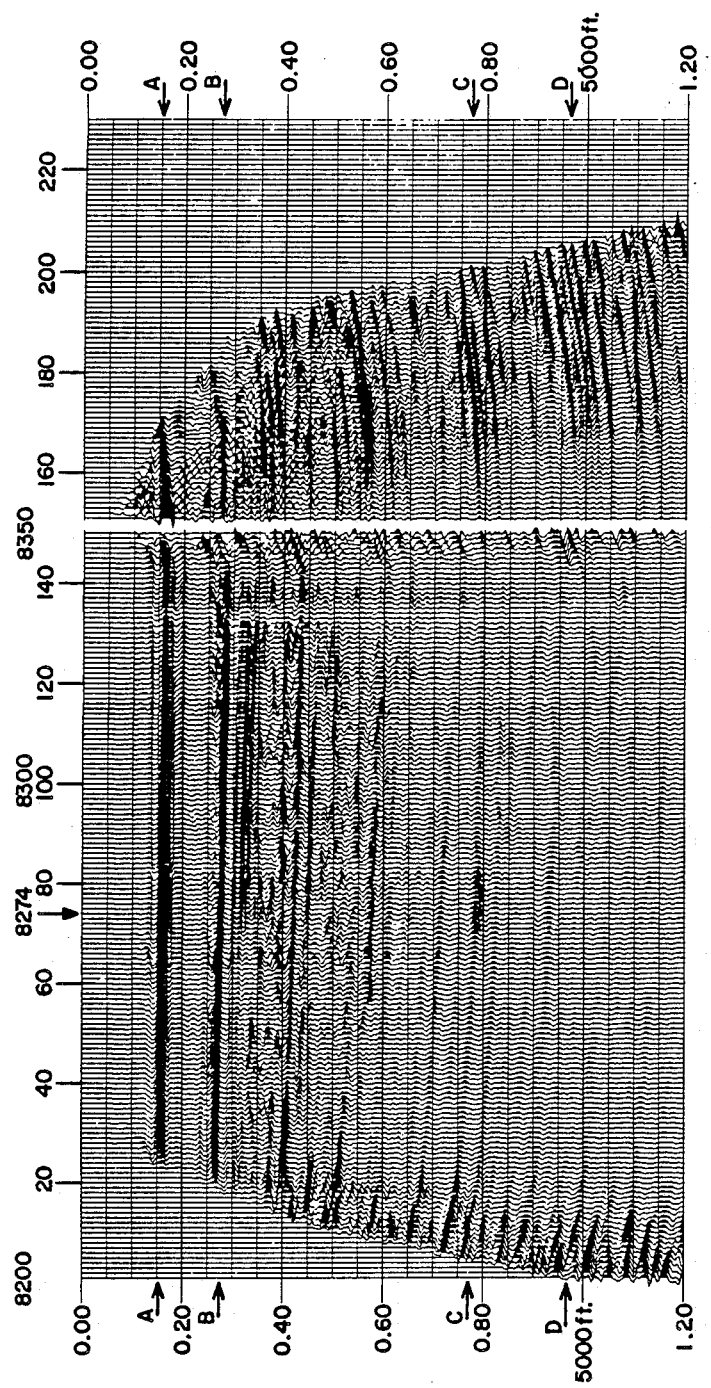
FIG. 2 is a display of a migrated depth section obtained with a velocity model that is correct for top reflectors but too slow for the bottom reflector.
FIG. 3 the post migrated parts at a predetermined shot point is displayed.

The present invention describes a method which determines the correct velocity from the moveout observed on FIG. 3 without further migration. In the following discussion, the velocity used in the original migration is referred to as the old model. The model obtained by changed the velocity between reflectors B and C will be referred to as the new model.

Figure 1A:
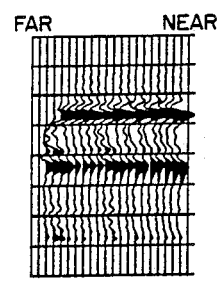
FIG. 1A is a graphical illustration of post migrated parts having the correct velocity.
Figure 1B:
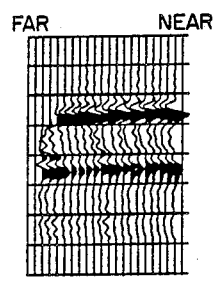
FIG. 1B is a graphical illustration of post migrated parts having a velocity that is too fast.
Figure 1C:
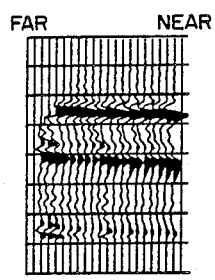
FIG. 1C is a graphical illustration of post migrated parts having a velocity that is too slow.
Figure 4:
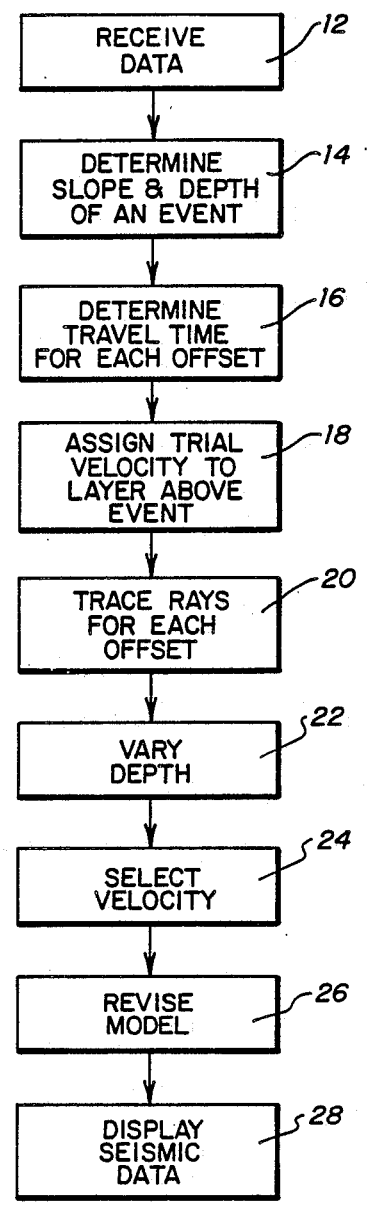
FIG. 4 illustrates a flow chart of the method of the present invention.

Referring now to FIG. 4, a block diagram of the flow chart of the method of the present invention is illustrated. The velocity estimation technique of the present invention may be described as follows. At block 12 data is received. This data may take the form of a number of post migrated parts, such as that illustrated in FIG. 3.

In block 14, the apparent depth and slope of a preselected event are determined. For example, the apparent depth and slope of event C is determined from FIG. 2 at shot point (S) 8274. The apparent depth of event C is measured from FIG. 3 for each offset in the post-migration parts. The depth values of the first 40 offsets are listed in Column 3 of Table 1, while the offsets are listed in Column 2.

Figure 5:
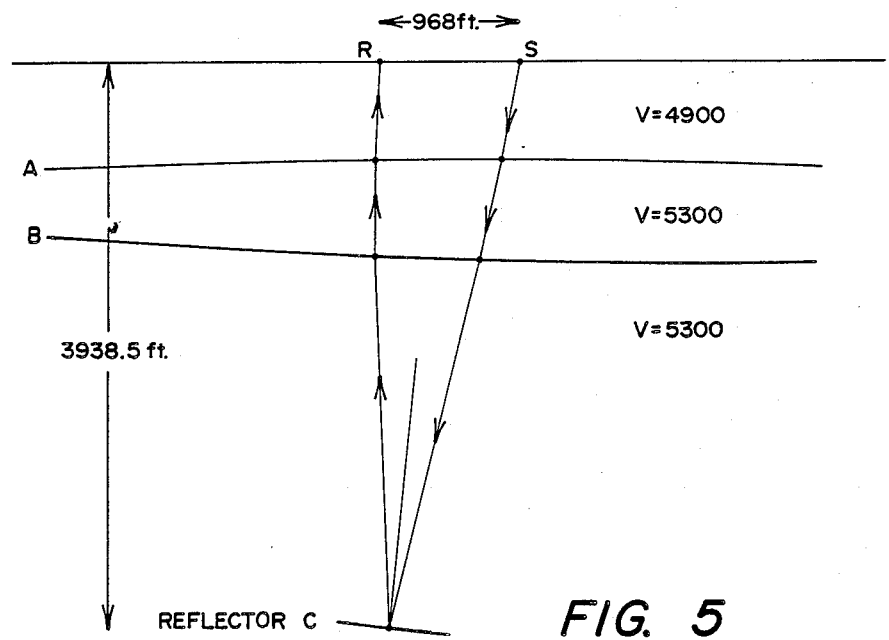
FIG. 5 is an example of a ray path found by ray tracing through the old model.

In block 16, the travel time for a predetermined offset is obtained. The travel time of the recorded reflection for a particular offset, for example the first, can be found by ray-tracing through the old model. FIG. 5 shows an example of such a ray path. The travel time along this ray, from source S to reflector C and back to receiver R, is 1.51070 sec which is recorded in Column 4. The traveltimes for each offset is listed in Column 4 of Table 1.

At block 18, a trial velocity is assigned to the layer above the preselected event. For example, a trial velocity is assigned to the layer between events B and C in the new model.

Figure 6:
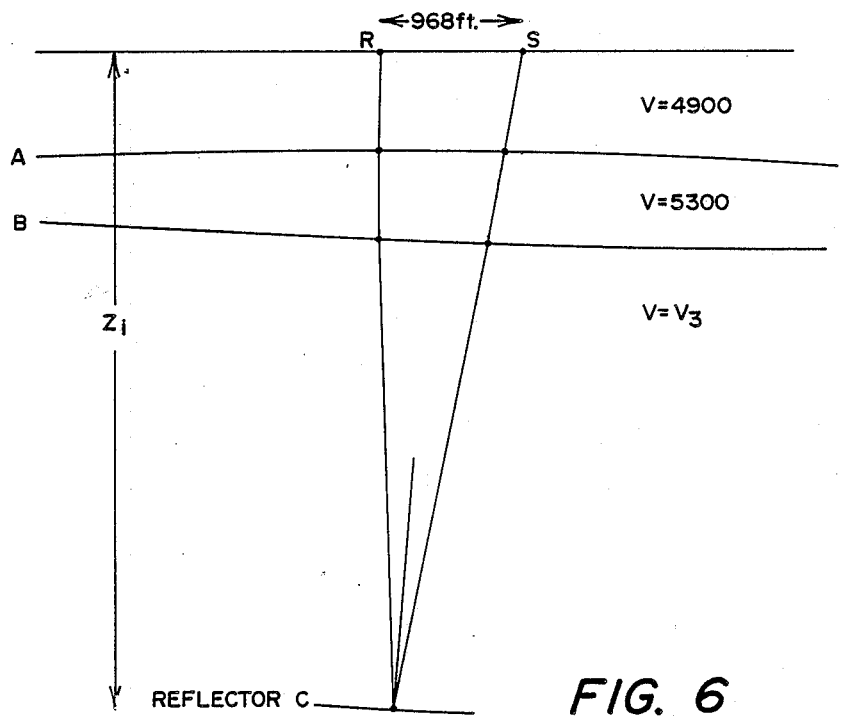
FIG. 6 is an example of a ray path where the velocity between the two lower reflectors is undetermined.

Rays are traced for each offset at block 20. For each offset, rays are traced from the source to reflector C and back to the receiver as illustrated in FIG. 6, computing a travel time for each iteration. The amount of ray shooting in block 20 can be greatly reduced by shooting at many surface locations from several depths. All needed traveltimes can be interpolated from these ray sets with sufficient accuracy.

At block 22 the depth of the preselected event is varied. The depth of the reflector is varied up or down until the computed travel time agrees with the measured travel time in Column 4 of Table 1. Note that the locations of the source and receiver will change as the depth of reflector C is varied in order to obey Snell's Law. However, the source receiver separation will be kept constant for each offset travel time.

At block 24 a new velocity is selected. The best velocity for the layer between reflectors B and C is the velocity for which the depths at each offset are the same. In practice, the velocity may be picked so that the agreement between depths is the best in a least squares sense. In this example, a velocity of 6630 ft/sec is chosen. The depths for each offset computed using this velocity are listed in Column 5 of Table 1.

Figures 7, 8:
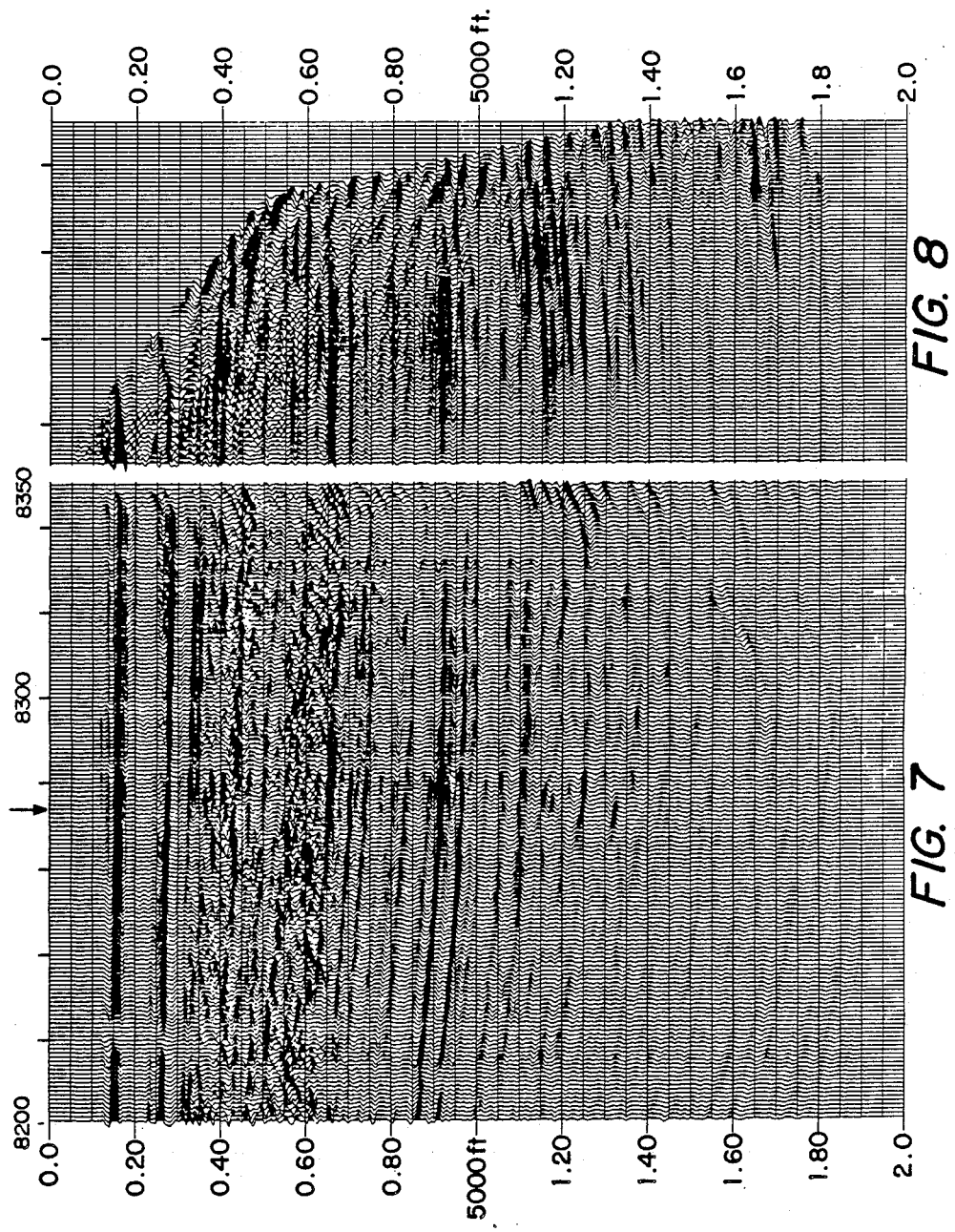
FIG. 7 is a display of a new depth section using the new velocity.
FIG. 8 illustrates the post migrated parts of the shot point of FIG. 3 using the new velocity.

At block 26 the old model may be revised using the new velocity that has been determined or selected by the foregoing method. Migration of the seismic data using a new model with the velocity of 6630 ft/sec between reflectors B and C produces the depth section show in FIG. 7. It is seen that the image of reflector C is much sharper. As illustrated in FIG. 8, the post-migration parts at S 8274 now contains a flat image at depth 4580 ft, meaning the computed velocity is accurate.

Depth of a reflector is a by-product of the velocity analysis. If the velocity analysis is conducted at many ground locations, there will be enough information to add a new layer to the model. It is possible to analyze more than one layer at a time if the corresponding depths can be picked from the original PMP (marked as D in FIG. 3). Deriving the traveltimes (Column 4, Table 1) should be done with the old model, but after adding one layer, velocity analysis of the second added layer (Column 5, Table 1) should be done using the latest model, i.e., with the layer between reflectors B and C added to the model before determining the velocity for the layer below reflector C.

The present invention has been described by way of a preferred embodiment for illustration purposes only. It is to be understood that one skilled in the art may make modifications to the present invention without departing from the scope of the following claims.

TABLE 1

| 1 Shot Point | 2 Offset (ft.) | 3 Image Depth (ft.) | 4 Travel Time (sec.) | 5 New Depth (ft.) |
|---|---|---|---|---|
| 1 | 968.0 | 3938.5 | 1.51070 | 4580.1 |
| 2 | 1050.0 | 3936.5 | 1.50995 | 4574.3 |
| 3 | 1132.0 | 3934.0 | 1.51355 | 4580.1 |
| 4 | 1214.0 | 3933.5 | 1.51337 | 4573.6 |
| 5 | 1296.0 | 3933.5 | 1.51840 | 4584.3 |
| 6 | 1378.0 | 3931.0 | 1.51747 | 4574.9 |
| 7 | 1460.0 | 3926.5 | 1.52142 | 4581.2 |
| 8 | 1542.0 | 3925.0 | 1.52087 | 4573.6 |
| 9 | 1624.0 | 3922.0 | 1.52633 | 4582.9 |
| 10 | 1706.0 | 3920.0 | 1.52560 | 4573.9 |
| 11 | 1788.0 | 3915.5 | 1.53084 | 4581.6 |
| 12 | 1870.0 | 3911.0 | 1.52919 | 4568.7 |
| 13 | 1952.0 | 3909.5 | 1.53624 | 4582.3 |
| 14 | 2034.0 | 3904.5 | 1.53442 | 4567.9 |
| 15 | 2116.0 | 3902.0 | 1.54183 | 4581.7 |
| 16 | 2198.0 | 3900.0 | 1.54183 | 4570.3 |

TABLE 1-continued

| 1 Shot Point | 2 Offset (ft.) | 3 Image Depth (ft.) | 4 Travel Time (sec.) | 5 New Depth (ft.) |
|---|---|---|---|---|
| 17 | 2280.0 | 3989.0 | 1.54327 | 4586.1 |
| 18 | 2362.0 | 3896.0 | 1.54855 | 4574.1 |
| 19 | 2444.0 | 3892.5 | 1.55651 | 4588.1 |
| 20 | 2526.0 | 3886.5 | 1.55436 | 4570.0 |
| 21 | 2608.0 | 3885.5 | 1.56409 | 4590.4 |
| 22 | 2690.0 | 3881.0 | 1.56249 | 4573.5 |
| 23 | 2772.0 | 3879.0 | 1.57244 | 4593.6 |
| 24 | 2854.0 | 3877.5 | 1.57191 | 4580.1 |
| 25 | 2936.0 | 3875.0 | 1.58217 | 4599.8 |
| 26 | 3018.0 | 3863.5 | 1.57989 | 4579.0 |
| 27 | 3100.0 | 3859.5 | 1.58287 | 4573.4 |
| 28 | 3182.0 | 3855.5 | 1.59357 | 4597.5 |
| 29 | 3264.0 | 3845.0 | 1.58994 | 4567.9 |
| 30 | 3346.0 | 3843.0 | 1.60178 | 4596.2 |
| 31 | 3428.0 | 3837.0 | 1.59973 | 4570.2 |
| 32 | 3510.0 | 3833.5 | 1.61135 | 4597.2 |
| 33 | 3592.0 | 3824.0 | 1.60812 | 4566.2 |
| 34 | 3674.0 | 3818.0 | 1.67979 | 4592.1 |
| 35 | 3756.0 | 3810.0 | 1.61719 | 4563.8 |
| 36 | 3838.0 | 3803.5 | 1.62916 | 4590.0 |
| 37 | 3920.0 | 3795.0 | 1.62632 | 4559.5 |
| 38 | 4002.0 | 3788.5 | 1.63877 | 4587.2 |
| 39 | 4084.0 | 3779.5 | 1.63580 | 4555.8 |
| 40 | 4166.0 | 3774.0 | 1.64894 | 4585.0 |

We claim:

1. A method for deriving interval velocities for a new model from post migration parts of an old model comprising the steps of:
   receiving seismic data including the old model having several events with layers between said events;
   determining the apparent depth and slope of a first event for each offset in the post migrated parts;
   determining the travel time of the recorded reflection from said first event for a particular offset by ray-tracing through the old model;
   assigning a trial velocity to the layer between said first event and a selected, event in the new model;
   tracing rays for each offset from the source to said first event and back to a receiver;
   computing a travel time for each ray traced;
   varying the depth of said first event up and down until the computed travel time agrees with the measured travel time previously determined;
   maintaining the source receiver separation constant for each offset travel time; and
   selecting a velocity for the layer between said first event and said selected event for which the depths at each offset are the same.

2. The method according to claim 1 wherein said selecting step includes the steps of:
   determining the depth correlation by a least squares process.

3. The method according to claim 1 wherein said tracing step includes the steps of:
   shooting a plurality of rays at several predetermined surface locations from events having different depths.

4. The method according to claim 1 also including the steps of:
   determining the apparent depth and slope of said event for each offset in the post migrated parts at a plurality of ground locations;
   determining the travel time of the recorded reflection from said event for said each offset by ray-tracing through the old model;

assigning a second trial velocity to the layer between said second event and a second selected event in the new model;

tracing rays for said each offset from the source to said second event and back to a receiver;

computing a travel time for each ray traced;

varying the depth of said second event up and down until the computed travel time agrees with the measured travel time previously determined;

maintaining the source receiver separation constant for said each offset travel time;

selecting a second velocity for the layer between said second event and the second selected event for which the depths at said each offset are the same; and adding an additional layer to said new model.

5. The method according to claim 4 wherein said selecting step includes the steps of:

determining the depth correlation by a least squares process.

6. The method according to claim 4 wherein said tracing step includes the steps of:

shooting a plurality of rays at several predetermined surface locations from events having different depths.

* * * * *